Patented Jan. 16, 1945

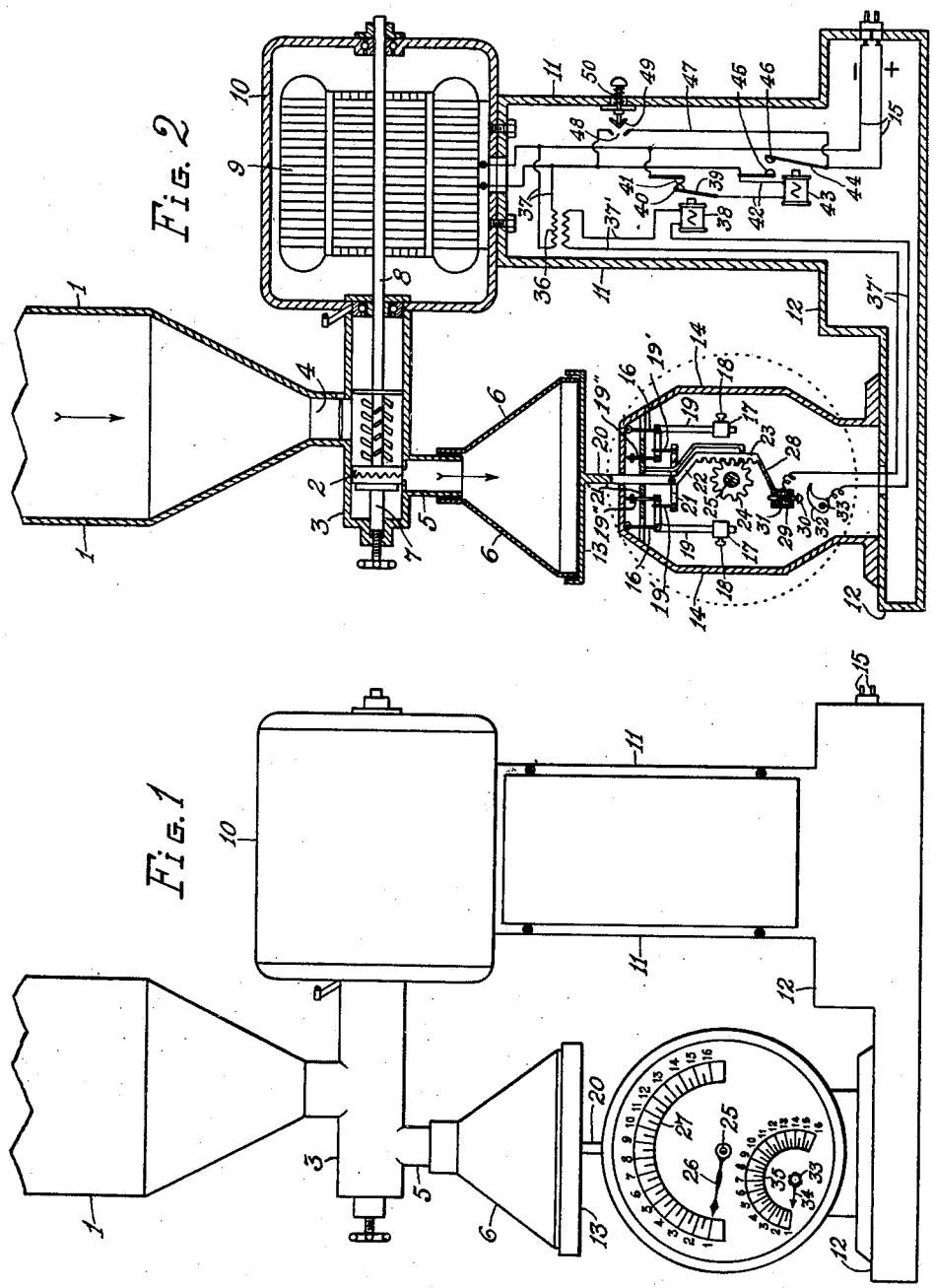

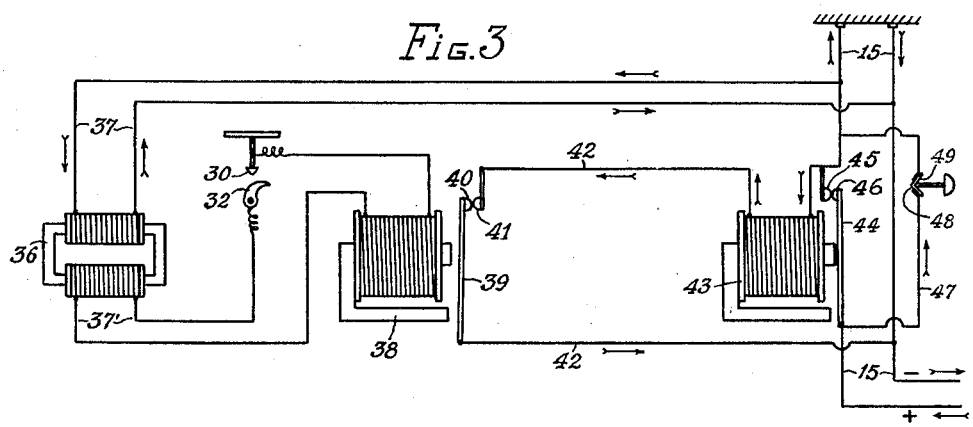
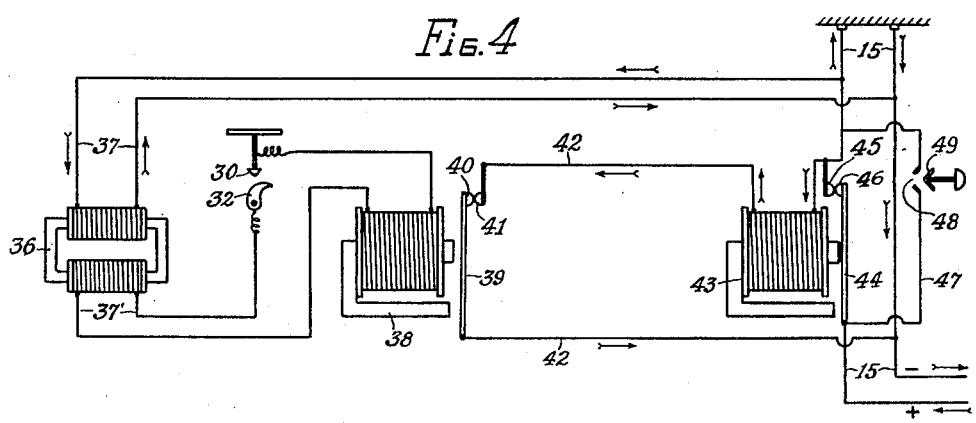
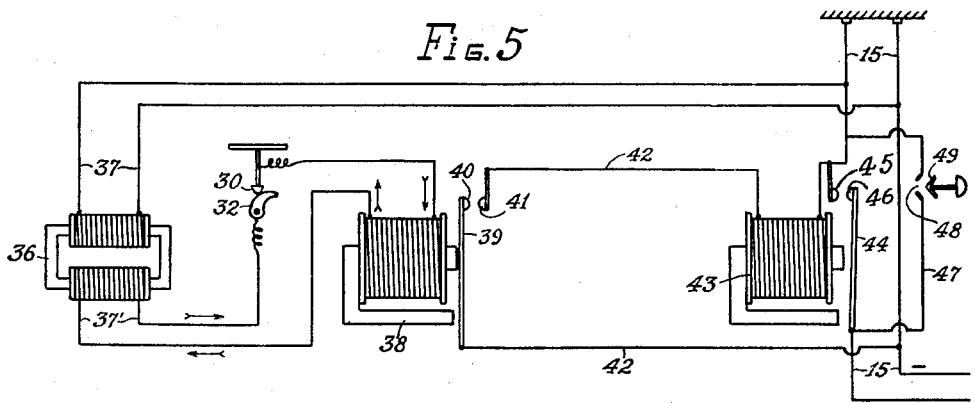

2,367,247

UNITED STATES PATENT OFFICE 2,367,247

COMBINED FEED MECHANISM AND WEIGHING DEVICE

Wenceslao Pinedo Valerino and José Arias Menendez, Habana, Cuba

Application March 3, 1941, Serial No. 381,568
In Cuba December 18, 1940

3 Claims. (Cl. 249—1)

This invention relates to grinding devices for coffee, grains, and the like, and it has for its object the provision of a combined grinding and weighing device in which a weighing mechanism is electrically connected with the electric motor operating the grinding device so that upon a pre-determined weight being indicated by the weighing mechanism on a scale dial associated with the weighing mechanism, the electric motor is automatically stopped, whereupon the grinding device will only discharge the amount of ground material strictly required by the purchaser, whereby waste of material will be avoided and the purchaser will be served fresh or just ground material.

The invention is described with reference to the figures of the accompanying drawings in which similar parts in the various views are indicated by the same reference characters, and in which:

Fig. 1 is an elevational side view of a coffee grinding device operated by an electric motor and combined with a weighing mechanism.

Fig. 2 is a vertical sectional view showing, in combination, the grinding device, the electric motor and the weighing mechanism.

Figs. 3, 4 and 5 are diagrammatic views showing the electric devices and circuits making the automatic operating connection between the weighing mechanism and the electric motor operating the grinding device, in its three respective operative phases, to wit: when the electric motor is not in operation, when the electric motor is in operation; and when the electric motor is caused to stop automatically.

In the drawings, 1 indicates a hopper or container for grain, coffee or the like, and 2 indicates a pulverizing mechanism which is not described in detail as it does not form a part of this invention and which is mounted within a cylindrical horizontal casing 3 in communication with the bottom of hopper 1 by an opening 4, the ground material being discharged below the casing 3 by a vertical tube 5 projecting downward from said casing 3. The ground material is protected in its fall by an inverted funnel 6 coupled to the discharge tube 5.

The movable member of the pulverizing mechanism 2 is caused to rotate by a horizontal shaft 7 permanently coupled to the driving shaft 8 of an electric motor 9 whose cover 10 is mounted above a cover 11 raised on a base 12 which supports beneath the discharge tube 5 for ground material the oscillatable plate 13 of a weighing device the mechanism of which is enclosed in a casing 14 supported on the base 12, the cover 11 and the base 12 having mounted therein the electric devices and circuits which electrically connect the weighing mechanism to the electric line 15 for supplying electric energy to the electric motor 9.

The lever and needle mechanism of the weighing device is adjustably mounted by means of supporting pieces 16 pivotally connected to the top of the casing 14 and bell-crank levers 19 pivotally connected to and hanging from said pieces 16, the longest vertical arms of said bell-crank levers 19 carrying weights 17 adjustable by means of clamping screws 18, the vertical stem 20 carrying the plate 13 being fixedly secured on the lower platform 21 which depends by needles carrying arms 19' from the shortest horizontal arms of said bell crank levers 19, these horizontal arms being pivotally connected to upwardly extending bars 19'' loosely guided through holes in an upper platform 21' secured to the side walls of casing 14. From said platform 21 diagonally projects downward an arm 22 carrying a vertical rack 23 meshing with a gear wheel 24 on a horizontal shaft 25 rotatably mounted on the casing 14 and projecting outwardly therefrom whereat it carries at one end a pointer 26 adapted to advance around a scale dial 27 marked on the outer surface of the casing 14. To the lower end of the vertical rack 23 is secured an arm 28 inclined towards the middle portion of the casing 14 and from said arm hangs a small box 29 enclosing the contact 30 actuated by a coil spring 31. At a pre-determined distance beneath the movable contact 30 is mounted a controlling cam stop in the shape of a curved claw 32 the curvature of which has been pre-determined and which is resiliently mounted on a horizontal shaft 33 rotatably mounted on the casing 14, by means of a coil spring not shown but which being rolled around the shaft 33, could have an end secured to the latter and the other end secured to claw 32. This shaft 33 projects outwardly from the casing 14 and carries at one of its ends a pointer 34 adapted to advance around a scale dial 35 the divisions of which correspond to the divisions on a scale 27. The operation relativeness between the two scales 27 and 35 is such that upon placing the pointer 34 in front of a division on scale 35 indicating a pre-determined weight, the movable contact 30 will contact the curved-claw stop 32 at the time when the plate 13 of the weighing mechanism has received from the grinding device 2 an amount of ground material which is exactly the weight marked on scale 35 and which will be indicated at the same time by the hand 26 on scale 27. As is seen, the movable contact 30 and the cam stop 32 form a so-called limit switch.

The electric devices and circuits making the connection between the weighing mechanism and the line 15 supplying alternating current to the electric motor 9 consist of: an electric transformer 36 suitably supported within the casing 11, the primary circuit 37 of which is connected in shunt to the electric line 15 and its secondary circuit 37' has a terminal on the movable contact 30 and the other terminal on the rotatable claw 32, a relay 38 being inserted in said secondary circuit 37', the armature 39 thereof carrying a contact 40 normally closed on another contact 41 interposed in an auxiliary electric circuit 42 in which is inserted the armature 39 and another relay 43. Said circuit 42 is connected in shunt to the electric energy supply line 15. The armature 44 of relay 43 is connected with a conductor of electric supply line 15 and carries a contact 46 which is normally kept spaced from a contact 45 connected with the same conductor of supply line 15. A normally open shunt 47 connected to the same conductor of line 15 bridging the armature 44 and contact may be closed at the gap 48 by a switch button 49 normally held open by a coil spring 50.

The operation of said electric mechanism is as follows: When the button 49 (Fig. 3) is pressed down, the electric current will flow through the shunt 47 to the motor 9 and also through the circuit 42; the relay 43 will be energized, whereby the armature 44 will be attracted and the contact 46 secured thereto will engage the fixed contact 45. The circuit through the armature 44 and contacts 45 and 46 is thereby closed to supply electric energy to the electric motor 9 even after the push button 49 is released. The driving shaft 7 of the grinding mechanism 2 will be actuated and a predetermined quantity of the grains contained in the hopper 1 will be ground, and fed to the weighing mechanism.

As the movable contact 30 engages the stop 32 (Fig. 5), which will occur when the hand 26 indicates on the scale 27 the same weight as indicated by the hand 34 previously adjusted on scale 35, the secondary circuit 37' of the coil 36 will be closed and the relay 38 will be energized and will attract armature 39 thereby causing the movable contact 40 to withdraw from the fixed contact 41. The auxiliary circuit 42 will thereby be opened and it will release the armature 44 of relay 43, thereby the contact 46 carried by it will withdraw from the fixed contact 45 and the circuit of the electric supply line 15 in which armature 44 is inserted will be broken. The supply of electric energy will be discontinued and the electric motor 9 and the grinding mechanism 2 operated by it will both be stopped, until the button 49 is pressed again.

Thus, by means of this invention, the grinding device will only grind the amount of material required to supply a pre-determined quantity of ground material, for, as the required weight is attained, the electric motor will automatically stop and the operation of the grinding device will be discontinued.

It is obvious that changes may be made in the construction details of the weighing mechanism and the arrangement of the electric devices and circuits, without thereby altering the essential character of the invention, which is such as claimed hereinafter.

What we claim is:

1. In the control mechanism for an electric motor driven feed mechanism for delivering ground material to a weighing machine provided with a dial and pointer type weight indicator on whose dial the instantaneous weight value is indicated by the pointer, the combination of a separate dial and pointer assembly whose pointer is arranged for selective setting, a limit switch comprising a contact movable relatively to the first dial and pointer and permanently connected with the weighing mechanism of the machine and a movable stop contact connected with the pointer of the separate dial, an electrical power line to supply electric power to the motor, a normally open switch in series with a conductor of the electric power line, a push button switch in a shunt around this conductor of the electric power line, a second electric circuit connected to said power line through said normally open switch and containing a normally closed switch and a relay controlling said normally open switch, and a third electric circuit in shunt with the electric power line containing said limit switch and a relay controlling said normally closed switch, whereby subsequent to energization of the motor through closure of the normally open switch by operation of the push button switch and upon closure of the limit switch, the control relay energized thereby will open the normally closed control switch and the electric circuit containing it will be interrupted, which restores the normally open switch to open condition for stopping the motor.

2. In the control mechanism for a motor driven feed mechanism delivering ground material to a weighing mechanism provided with a dial and pointer on whose dial the instantaneous weight value is indicated by the pointer, the combination of a separate dial and pointer assembly whose pointer is arranged for selective setting at a position corresponding to a predetermined weight, a limit switch comprising a contact movable relatively to the first dial and pointer and permanently connected with the weighing mechanism of the machine and a cam stop contact connected with the pointer of the separate dial, an electric power line to supply electric power to the motor, a normally open switch in series with a conductor of the electric power line, a push button switch in a shunt around this conductor of the electric power line at points at each side of the normally open switch, a second electric circuit in shunt with the electric power line at points at each side of the normally open switch and containing a relay controlling the normally open switch, and a control circuit containing said limit switch and a relay controlling a normally closed control switch serially connected with the first relay, whereby, subsequent to instantaneous pressure on the push button the normally open switch is closed through the second circuit and the motor energized by the electric power line, and subsequent to the closing of the limit switch when the pointer on the first dial indicates the predetermined weight, the control circuit will be closed and the relay energized thereby will open the normally closed control switch to deenergize the first relay which restores the normally open switch to open condition for breaking the electric power line and for stopping the motor.

3. In a combined feed mechanism and weighing device, a weighing mechanism below the delivery outlet of the feed mechanism, an electric motor coupled to the feed mechanism and an electric power line for supplying current to the electric motor, and a dial and pointer weight indicator the pointer of which is controlled by the weighing mechanism for indicating the weight thereon, the combination of a separate dial and pointer assembly whose pointer is arranged for selective setting at a position corresponding to a predetermined weight, a limit switch comprising a contact rectilinearly movable relatively to the weighing mechanism and controlled thereby and a cam stop contact connected with the pointer of the separate dial and adapted to be engaged by the first contact when the predetermined weight has been reached, a second switch normally open and connected in series with a conductor of the electric power line, a shunt around the same conductor of the electric power line and connected therewith at points at each side of the second switch, a resiliently biased push button switch in said shunt, a third switch normally closed, a first relay to cooperate with the third switch, a second relay to cooperate with the second switch, a second electric circuit in shunt with the electric power line at points at each side of the second switch and including the third switch and the second relay, a third electric circuit in shunt with the electric power line at points between the shunt and the electric motor and including the limit switch and the first relay, so that by instantaneously closing the push button switch the current conducted by the electric power line is supplied to the second electric circuit and the second relay is energized to close the second switch through which the current is supplied to the electric motor from the electric power line, and when the limit switch is closed by the weighing mechanism under a predetermined weight, the third circuit will be completed and the first relay will be energized and cause the second circuit to be opened and the second relay to become deenergized, which will open the second switch to cut-off the current supply to the electric motor and stop the latter.

WENCESLAO PINEDO VALERINO.
JOSÉ ARIAS MENENDEZ.